(12) United States Patent
Aota et al.

(10) Patent No.: US 8,853,909 B2
(45) Date of Patent: Oct. 7, 2014

(54) MOTOR AND ITS ROTOR AND MAGNETIC CORE FOR ROTOR HAVING ARRANGEMENT OF NON-MAGNETIC PORTIONS

(75) Inventors: Keiji Aota, Shiga (JP); Akio Yamagiwa, Shiga (JP); Yoshiki Yasuda, Shiga (JP)

(73) Assignee: Daikin Industries, Ltd., Osaka (JP)

( * ) Notice: Subject to any disclaimer, the term of this patent is extended or adjusted under 35 U.S.C. 154(b) by 1465 days.

(21) Appl. No.: 12/086,705

(22) PCT Filed: Dec. 12, 2006

(86) PCT No.: PCT/JP2006/324726
§ 371 (c)(1),
(2), (4) Date: Jun. 18, 2008

(87) PCT Pub. No.: WO2007/072707
PCT Pub. Date: Jun. 28, 2007

(65) Prior Publication Data
US 2009/0026865 A1    Jan. 29, 2009

(30) Foreign Application Priority Data

Dec. 19, 2005 (JP) .................................. 2005-364982

(51) Int. Cl.
*H02K 1/27* (2006.01)
(52) U.S. Cl.
CPC ....................................... *H02K 1/276* (2013.01)
USPC ................................. 310/156.53; 310/156.57
(58) Field of Classification Search
USPC ........................... 310/156.53, 156.56, 156.57
IPC ...................................................... H02K 1/27
See application file for complete search history.

(56) References Cited

U.S. PATENT DOCUMENTS

| | | | |
|---|---|---|---|
| 6,218,753 B1 * | 4/2001 | Asano et al. | 310/156.53 |
| 6,329,734 B1 | 12/2001 | Takahashi et al. | |
| 2002/0171309 A1 * | 11/2002 | Wakui et al. | 310/156.48 |
| 2004/0256940 A1 * | 12/2004 | Tsuruta et al. | 310/156.53 |
| 2006/0145556 A1 * | 7/2006 | Aota et al. | 310/156.53 |

FOREIGN PATENT DOCUMENTS

| | | | |
|---|---|---|---|
| JP | 4-210758 A | | 7/1992 |
| JP | 04210758 A | * | 7/1992 |
| JP | 11-98731 A | | 4/1999 |
| JP | 2000-69695 A | | 3/2000 |

(Continued)

*Primary Examiner* — Burton Mullins
*Assistant Examiner* — Michael Andrews
(74) *Attorney, Agent, or Firm* — Birch, Stewart, Kolasch & Birch, LLP (57) ABSTRACT

A first non-magnetic portion, a second non-magnetic portion, and a third non-magnetic portion are arranged around an axis, from an end toward the center of a permanent magnet burying hole. A fourth non-magnetic portion is further provided between the second non-magnetic portion and the third non-magnetic portion. Angles around the axis are determined as follows with reference to a position between permanent magnet burying holes. The position between the first non-magnetic portion and the second non-magnetic portion is expressed by a first angle. The position between the third non-magnetic portion and the fourth non-magnetic portion is expressed by a second angle, and the second angle is twice the first angle. The end of the third non-magnetic portion located closer to the pole center is expressed by a third angle. The first angle and the third angle are values obtained by dividing 360 degrees respectively by a value that is seven times, and a value that is three times, the number of the permanent magnet burying holes.

18 Claims, 10 Drawing Sheets

(56) References Cited

FOREIGN PATENT DOCUMENTS

| JP | 2000-217287 | A | 8/2000 |
|---|---|---|---|
| JP | 2001-037127 | A | 2/2001 |
| JP | 2002-44888 | A | 2/2002 |
| JP | 2002-354727 | A | 12/2002 |
| JP | 2003-61283 | A | 2/2003 |
| JP | 2004/320989 | A | 11/2004 |
| JP | 2004-343861 | A | 12/2004 |
| JP | 2005-027422 | A | 1/2005 |
| WO | WO-2005/004307 | A1 | 1/2005 |
| WO | WO 2005004307 | A1 * | 1/2005 |

* cited by examiner

MOTOR AND ITS ROTOR AND MAGNETIC CORE FOR ROTOR HAVING ARRANGEMENT OF NON-MAGNETIC PORTIONS

CROSS-REFERENCE TO RELATED APPLICATIONS

This U.S. National Stage application claims priority under 35 U.S.C. §119(a) to Japanese Patent Application No. 2005-364982, filed in Japan on Dec. 19, 2005, the entire contents of which are hereby incorporated by reference.

TECHNICAL FIELD

The present invention relates to a motor, and particularly to the structure of a rotor of an interior permanent magnet motor.

BACKGROUND ART

In a rotor of an interior permanent magnet motor, the permanent magnets are buried in a magnetic core composed of laminated steel plates, for example. A stator is provided along the outer periphery or inner periphery of the rotor.

In the magnetic flux generated by the permanent magnets, the part passing only through the magnetic core without passing through the stator does not effectively contribute to the generation of torque. Accordingly, in order to reduce the magnetic flux passing only through the magnetic core, structures are proposed in which non-magnetic portions are provided at the ends of the permanent magnets, differed from the pole faces (For example, Patent Document 1). Also, proposed techniques include a technique in which the configuration of the non-magnetic portions is designed so as to reduce iron loss and copper loss (Patent Document 2), a technique in which a skew is obtained in a pseudo manner (Patent Document 3), and a technique in which odd harmonics are reduced (Patent Document 4).

Patent Document 1: Japanese Patent Application Laid-Open No. 11-98731 (1999)
Patent Document 2: Japanese Patent Application Laid-Open No. 2002-44888
Patent Document 3: Japanese Patent Application Laid-Open No. 2000-69695
Patent Document 4: International Publication 2005/004307

DISCLOSURE OF THE INVENTION

In general, when the magnetic flux density on the rotor surface is distributed in a sinusoidal form, the magnetic flux linking with the stator is also in a sinusoidal form. On the other hand, harmonic components incur increased iron loss, increased noise, and difficulties in controllability.

Accordingly, an object of the present invention is to provide a structure that offers an improved magnetic flux density on the rotor surface.

According to a first aspect of the present invention, a magnetic core (18) for a rotor comprises permanent magnet burying holes (12) arranged around an axis (Q), and a first non-magnetic portion (13), a second non-magnetic portion (14), and a third non-magnetic portion (16) arranged around the axis from an end toward a center of each said permanent magnet burying hole.

According to a second aspect of the present invention, in the magnetic core for a rotor of the first aspect, seen in a direction along said axis (Q), said first non-magnetic portion (13) has a larger area than said second non-magnetic portion (14), and said second non-magnetic portion has a larger area than said third non-magnetic portion (16).

According to a third aspect of the present invention, in the magnetic core for a rotor of any of the first to second aspects, a value (θ3) of an angle around said axis (Q) with reference to a position between adjacent said permanent magnet burying holes (12), translated from a position of an end of said third non-magnetic portion (16) that is located closer to a center of corresponding said permanent magnet burying hole (12), is a value obtained by dividing 360 degrees by a value that is three times the number of said permanent magnet burying holes (12).

According to a fourth aspect of the present invention, in the magnetic core for a rotor of any of the first to third aspects, when expressed as an angle around said axis (Q) with reference to a position between adjacent said permanent magnet burying holes (12), then an angle (θ7) corresponding to a position between said first non-magnetic portion (13) and said second non-magnetic portion (14) is a value obtained by dividing 360 degrees by a value that is seven times the number of said permanent magnet burying holes (12).

According to a fifth aspect of the present invention, in the magnetic core for a rotor of any of the first to fourth aspects, said first non-magnetic portion (13), said second non-magnetic portion (14), and said third non-magnetic portion (16) are air gaps.

According to a sixth aspect of the present invention, in the magnetic core for a rotor of any of the first to fifth aspects, said magnetic core further comprises a fourth non-magnetic portion (15) arranged around said axis (Q) together with said first non-magnetic portion (13), said second non-magnetic portion (14), and said third non-magnetic portion (16), said fourth non-magnetic portion (15) being positioned between said second non-magnetic portion and said third non-magnetic portion. Wherein, when expressed as an angle around said axis (Q) with reference to a position between adjacent said permanent magnet burying holes (12), then an angle (2·θ7) corresponding to a position between said third non-magnetic portion (16) and said fourth non-magnetic portion (15) is twice an angle (θ7) corresponding to a position between said first non-magnetic portion (13) and said second non-magnetic portion (14).

According to a seventh aspect of the present invention, in the magnetic core for a rotor of any of the first to fifth aspects, said magnetic core further comprises a fourth non-magnetic portion (15) arranged around said axis (Q) together with said first non-magnetic portion (13), said second non-magnetic portion (14), and said third non-magnetic portion (16), said fourth non-magnetic portion (15) being positioned between said second non-magnetic portion and said third non-magnetic portion. Wherein, when a position between said second non-magnetic portion (14) and said fourth non-magnetic portion (15) is expressed as a value (θ5) of an angle around said axis (Q) with reference to a position between adjacent said permanent magnet burying holes (12), then said value (θ5) is a value obtained by dividing 360 degrees by a value that is five times the number of said permanent magnet burying holes (12).

According to an eighth aspect of the present invention, in the magnetic core for a rotor of any of the sixth to seventh aspects, seen in a direction along said axis (Q), said fourth non-magnetic portion (15) has an area smaller than that of said second non-magnetic portion (14) and larger than that of said third non-magnetic portion (16).

According to a ninth aspect of the present invention, in the magnetic core for a rotor of any of the sixth to eighth aspects, said first non-magnetic portion (13), said second non-magnetic portion (14), said third non-magnetic portion (16), and said fourth non-magnetic portion (15) are air gaps.

According to a tenth aspect of the present invention, in the magnetic core for a rotor of any of the first to ninth aspects, a distance (L) between one said first non-magnetic portion (13) provided at an end of one said permanent magnet burying hole (12) another and said first non-magnetic portion provided at an end of another said permanent magnet burying hole adjacent to said one permanent magnet burying hole becomes larger from said axis (Q) toward a side that a stator faces.

According to an eleventh aspect of the present invention, a magnetic core for a rotor comprises permanent magnet burying holes (12) arranged around an axis (Q), and a non-magnetic portion (13d; 13e) that extends around the axis from an end toward a center of each said permanent magnet burying hole, said non-magnetic portion having at least one step (P1, P2, P3, P4) and having a width narrowing in a direction of its extension.

According to a twelfth aspect of the present invention, in the magnetic core for a rotor of the eleventh aspect, a value (θ3) of an angle around said axis (Q) with reference to a position between adjacent said permanent magnet burying holes (12), translated from a position of an end (P4) of said non-magnetic portion (13d, 13e) that is located closer to a center of corresponding said permanent magnet burying hole (12), is a value obtained by dividing 360 degrees by a value that is three times the number of said permanent magnet burying holes (12).

According to a thirteenth aspect of the present invention, in the magnetic core for a rotor of any of the eleventh to twelfth aspects, a value (θ5) of an angle around said axis (Q) with reference to a position between adjacent said permanent magnet burying holes (12), translated from a position of one said step (P2), is a value obtained by dividing 360 degrees by a value that is five times the number of said permanent magnet burying holes (12).

According to a fourteenth aspect of the present invention, in the magnetic core for a rotor of any of the eleventh to thirteenth aspects, a value (θ7) of an angle around said axis (Q) with reference to a position between adjacent said permanent magnet burying holes (12), translated from a position of one said step (P1), is a value obtained by dividing 360 degrees by a value that is seven times the number of said permanent magnet burying holes (12).

According to a fifteenth aspect of the present invention, in the magnetic core for a rotor of any of the eleventh to fourteenth aspects, said at least one step comprises at least two steps, and wherein, when expressed as an angle around said axis (Q) with reference to a position between adjacent said permanent magnet burying holes (12), then an angle (2·θ7) corresponding to a position of first said step (P3) is twice an angle (θ7) corresponding to a position of second said step (P1).

According to a sixteenth aspect of the present invention, in the magnetic core for a rotor of any of the eleventh to fifteenth aspects, said step(s) appear on a side facing said permanent magnet burying hole (12).

According to a seventeenth aspect of the present invention, in the magnetic core for a rotor of any of the eleventh to fifteenth aspects, said step(s) appear on a side opposite from said permanent magnet burying hole (12).

According to an eighteenth aspect of the present invention, in the magnetic core for a rotor of any of the eleventh to seventeenth aspects, said non-magnetic portion (13d; 13e) is an air gap.

According to a nineteenth aspect of the present invention, in the magnetic core for a rotor of any of the eleventh to eighteenth aspects, a distance (L) between one said non-magnetic portion (13d; 13e) provided at an end of one said permanent magnet burying hole (12) and another said non-magnetic portion provided at an end of another said permanent magnet burying hole adjacent to said one permanent magnet burying hole becomes larger from a side closer to said axis (Q) toward a side that a stator faces.

According to the present invention, a rotor comprises the magnetic core for a rotor according to any of the first to nineteenth aspects of the present invention, and permanent magnets (10) buried in said permanent magnet burying holes (12).

According to the present invention, a motor comprises the rotor of the present invention, and a stator (2) that faces said rotor in parallel with said axis (Q). Preferably, an armature winding is wound on said stator (2) in a distributed winding manner.

According to the magnetic core for a rotor of the first aspect of the present invention, when a rotor is formed by burying permanent magnets in the permanent magnet burying holes, alleviates stepwise differences in the amount of field magnetic flux flowing out from the permanent magnets, between the pole intervals and pole centers of the magnetic poles presented by the permanent magnets. This makes the magnetic flux density on the rotor surface closer to a sinusoidal wave.

Furthermore, mechanical strength is enhanced while reducing harmonics that cross zero at angles around the axis with reference to a position between permanent magnet burying holes, translated from the position between the first non-magnetic portion and the second non-magnetic portion, and the position between the second non-magnetic portion and the third non-magnetic portion.

According to the magnetic core for a rotor of the second and eighth aspects of the present invention, the areas of the non-magnetic portions is larger at the end of a permanent magnet burying hole than that at the center area thereof; accordingly, when a rotor is formed by burying permanent magnets in the permanent magnet burying holes, the magnetic flux generated from the permanent magnet is less likely to flow outside at the end of the permanent magnet burying hole. This makes the magnetic flux density on the rotor surface closer to a sinusoidal wave.

According to the magnetic core for a rotor of the third aspect of the present invention, the end of a third non-magnetic portion that is located closer to the center of the permanent magnet burying hole occupies a position corresponding to a phase at which the third harmonic is zero in the magnetic flux generated by the permanent magnets buried in the permanent magnet burying holes, so that the suppression of the third harmonic is not hindered even when the magnetic flux flows outside in the vicinity of this position.

According to the magnetic core for a rotor of the fourth aspect of the present invention, the angle corresponding to the position between the first non-magnetic portion and the second non-magnetic portion corresponds to a phase at which the seventh harmonic is zero in the magnetic flux generated by the permanent magnets buried in the permanent magnet burying holes, so that mechanical strength is enhanced without hindering the suppression of the seventh harmonic even when the magnetic flux flows outside in the vicinity of this position.

According to the magnetic core for a rotor of the fifth, ninth, and eighteenth aspects of the present invention, the magnetic core is easily constructed by stacking blanked steel plates.

According to the magnetic core for a rotor of the sixth aspect of the present invention, it further enhances the mechanical strength while reducing the harmonics that cross zero at the angle corresponding to the position between the first non-magnetic portion and the second non-magnetic portion.

According to the magnetic core for a rotor of the seventh aspect of the present invention, the position between the second non-magnetic portion and the fourth non-magnetic portion corresponds to a phase at which the fifth harmonic is zero in the magnetic flux generated by the permanent magnets buried in the permanent magnet burying holes, so that mechanical strength is enhanced without hindering the suppression of the fifth harmonic even when the magnetic flux flows outside in the vicinity of this position.

According to the magnetic core for a rotor of the tenth and nineteenth aspects of the present invention, the magnetic core is less likely to experience magnetic saturation on the side that the stator faces. Thus, on the side that the stator faces, the magnetic flux generated from a permanent magnet inserted in one permanent magnet burying hole is prevented from flowing in a short-circuit manner within the rotor to a permanent magnet inserted in adjacent another permanent magnet burying hole, which prevents reduction of the magnetic flux that links with the stator and contributes to the generation of torque.

According to the magnetic core for a rotor of the eleventh aspect of the present invention, when a rotor is formed by burying permanent magnets in the permanent magnet burying holes, the varying width of the non-magnetic portions alleviates stepwise differences in the amount of magnetic flux flowing out from the permanent magnets, between the pole intervals and pole centers of the magnetic poles presented by the permanent magnets. This makes the magnetic flux density on the rotor surface closer to a sinusoidal wave.

Also, reduced is the harmonics that cross zero at an angle around the axis with reference to a position between permanent magnet burying holes, translated from the position of a step of the non-magnetic.

According to the magnetic core for a rotor of the twelfth aspect of the present invention, the end of a non-magnetic portion that is located closer to the center of the permanent magnet burying hole occupies a position corresponding to a phase at which the third harmonic is zero in the magnetic flux generated by the permanent magnets buried in the permanent magnet burying holes, so that the suppression of the third harmonic is not hindered even when the magnetic flux flows outside in the vicinity of this position.

According to the magnetic core for a rotor of the thirteenth aspect of the present invention, the position of the step corresponds to a phase at which the fifth harmonic is zero in the magnetic flux generated by the permanent magnets buried in the permanent magnet burying holes, so that the suppression of the fifth harmonic is not hindered even when the magnetic flux flows outside in the vicinity of this position.

According to the magnetic core for a rotor of the fourteenth aspect of the present invention, the angle corresponding to the position of the step corresponds to a phase at which the seventh harmonic is zero in the magnetic flux generated by the permanent magnets buried in the permanent magnet burying holes, so that the suppression of the seventh harmonic is not hindered even when the magnetic flux flows outside in the vicinity of this position.

According to the magnetic core for a rotor of the fifteenth aspect of the present invention, it reduces the harmonics that cross zero at the angle corresponding to the position of the second step.

The motor of the present invention is suitable for use with a stator having a distributed armature winding, because suppressing the third harmonic is demanded especially when such a stator is adopted.

These and other objects, features, aspects and advantages of the present invention will become more apparent from the following detailed description of the present invention when taken in conjunction with the accompanying drawings.

BEST MODE FOR CARRYING OUT THE INVENTION

First Preferred Embodiment

Figure 1:
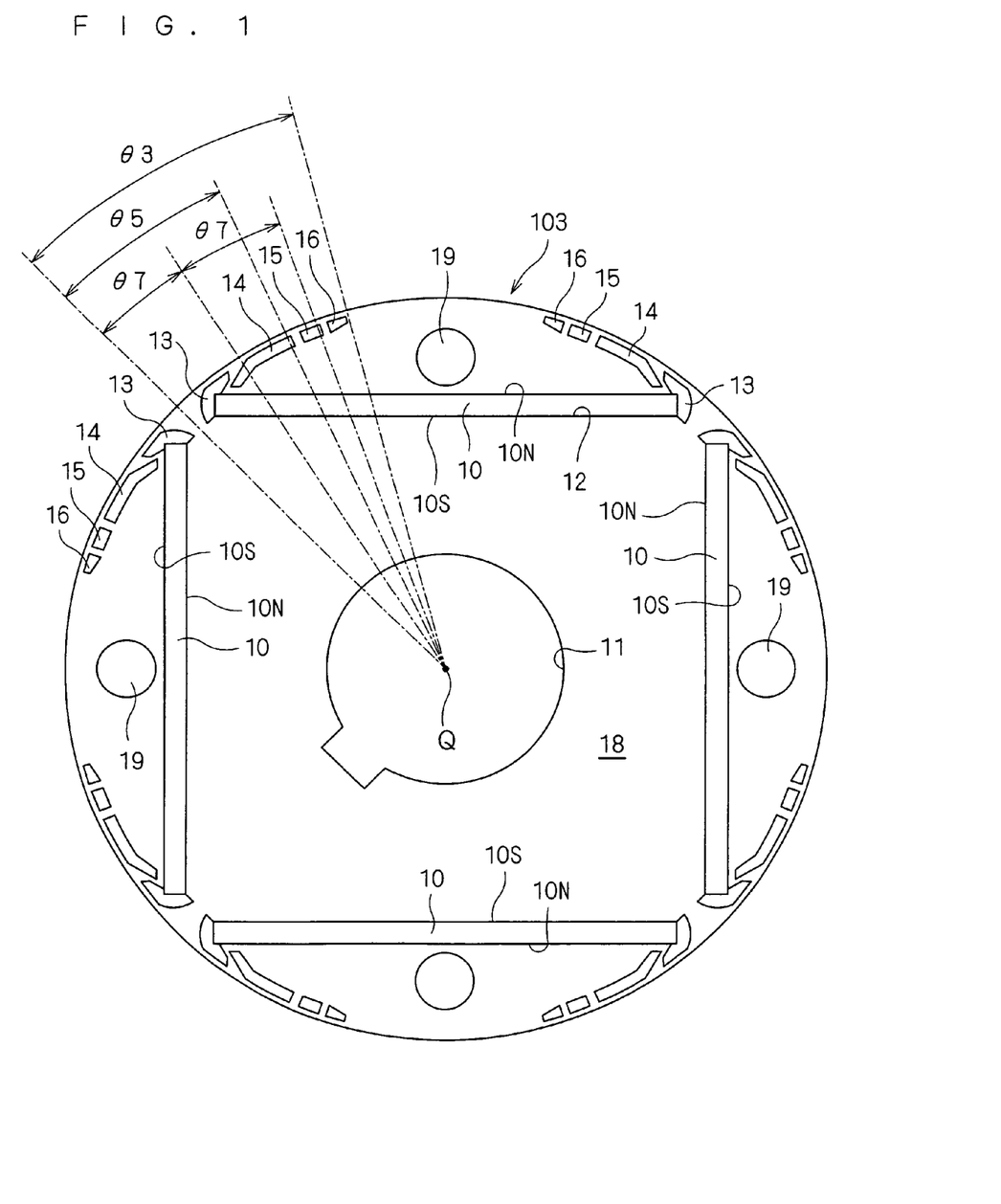
FIG. 1 is a cross-sectional view illustrating the structure of a rotor according to a first preferred embodiment of the present invention.

FIG. 1 is a cross-sectional view illustrating the structure of a rotor 103 according to a first preferred embodiment of the present invention, which shows a cross section perpendicular to the axis Q. The rotor 103 rotates relative to a stator (not shown) around the axis Q. This rotor structure illustrates a so-called inner rotor type in which the stator exists outside the rotor 103. However, this does not intend to deny the applicability of the present invention to a so-called outer rotor type in which the stator exists inside the rotor 103.

The rotor 103 includes its magnetic core 18 and permanent magnets 10. The magnetic core 18 has permanent magnet burying holes 12 arranged around the axis Q, and the permanent magnets 10 are buried in the permanent magnet burying holes 12. The permanent magnets 10 have pole faces 10N and 10S of different polarities. Adjacent ones of the permanent magnets 10 have their pole faces of mutually different polarities facing toward the outer periphery of the rotor 103. With the presence of the pole faces, the rotor 103 generates magnetic poles around the outer periphery. In this example, four (two pairs of) permanent magnets 10 are provided, and thus the number of magnetic pole pairs is 2.

The magnetic core 18 can be made of laminations of steel plates, for example, with adjacent steel plates being placed on each other along the axis Q direction with fastening members (not shown) inserted in fastening holes 19.

From each end of the permanent magnet burying holes 12, non-magnetic portions 13, 14, 15 and 16 are arranged around the axis Q toward the center of the permanent magnet burying hole 12. For example, it is desirable to form the non-magnetic portions 13, 14, 15 and 16 as air gaps, because then the magnetic core 18 can be constructed easily with laminated steel plates having blanks in the positions of the non-magnetic portions 13, 14, 15 and 16.

Seen from each permanent magnet 10, the non-magnetic portions 13, 14, 15 and 16 are positioned on the side closer to the outer periphery of the rotor 103, and the rotor 103 faces the stator on its outer periphery side, so that the non-magnetic portions 13, 14, 15 and 16 hinder the magnetic flux (field magnetic flux) generated from the permanent magnets 10 from linking with the stator. Accordingly, the amount of field magnetic flux flowing out of the rotor 103 (which corresponds to the amount of magnetic flux linking the stator) is less likely to differ stepwise between the pole intervals and the pole centers.

The non-magnetic portions 13 have a function of reducing the field magnetic flux passing only through the magnetic core without passing through the stator, and they also have a function of alleviating the above-mentioned stepwise differences in the amount of field magnetic flux. However, providing only the non-magnetic portions 13 is not sufficient to alleviate the stepwise differences in the amount of field magnetic flux, and the variation of the magnetic flux density on the surface of the rotor 103 considerably differs from a sinusoidal wave.

However, with the presence of the non-magnetic portions 14, 15 and 16, the magnetic flux density variation on the surface of the rotor 103 becomes further closer to a sinusoidal wave. As compared with a structure in which the non-magnetic portions 13, 14, 15 and 16 are formed continuously, the structure of this preferred embodiment is desirable in terms of mechanical strength, because the magnetic core 18 exists between the non-magnetic portions 13, 14, 15 and 16.

FIG. 1 shows angles around the axis Q with respect to a position between the permanent magnet burying holes 12. The position between the non-magnetic portions 13 and 14 is expressed as an angle $\theta 7$, the position between the non-magnetic portions 14 and 15 is expressed as an angle $\theta 5$, and the position between the non-magnetic portions 15 and 16 is expressed as an angle $2 \cdot \theta 7$. Also, the end of the non-magnetic portion 16 that is positioned closer to the pole center is expressed as an angle $\theta 3$. In other words, the non-magnetic portions exist adjacent each other with the magnetic core 18 existing between them in the positions expressed by these angles. However, as shown in FIG. 1, the positions of the non-magnetic portions may be somewhat shifted, for reasons of design.

Even when the non-magnetic portions do not exist in the positions designated by these angles, when the positions correspond to angles at which harmonics cross zero, it is possible to enhance the mechanical strength of the magnetic core 18 without hindering reductions of the harmonics.

Figure 2:
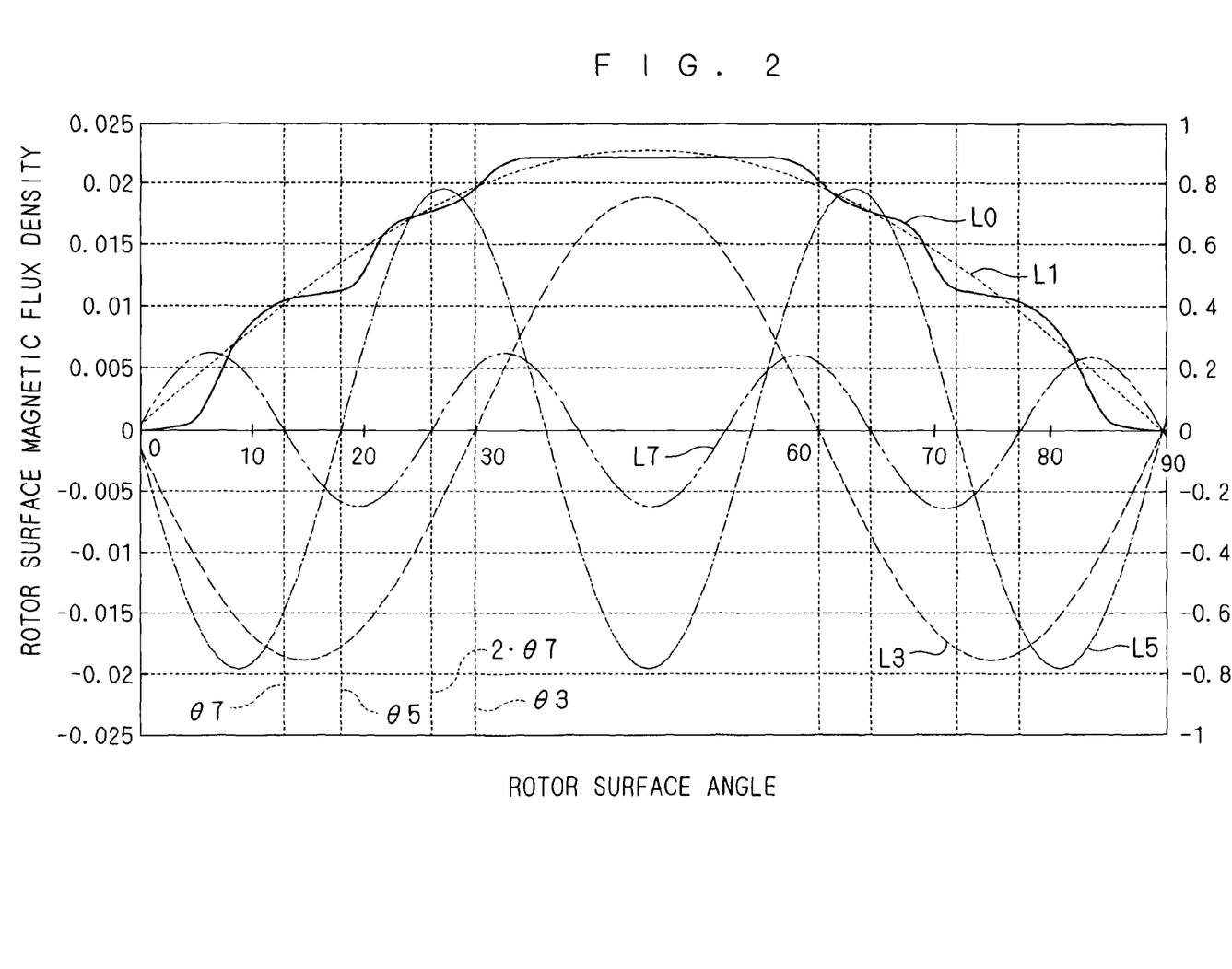
FIG. 2 is a graph illustrating the waveform of field magnetic flux appearing on the rotor surface.

FIG. 2 is a graph illustrating the waveform of field magnetic flux appearing on the rotor surface. This preferred embodiment has two pairs of poles, and so 180 degrees in terms of the angle on the rotor surface corresponds to one period of the field magnetic flux, and a range of 0 to 90 degrees corresponds to one magnetic pole.

The curve L0 shows the waveform of the field magnetic flux appearing on the rotor surface, and the curves L1, L3, L5 and L7 respectively show the fundamental wave, third harmonic, fifth harmonic, and seventh harmonic of the field magnetic flux. The third, fifth, and seventh harmonics cross zero at the angles $\theta 3$, $\theta 5$ and $\theta 7$, respectively. In other words, the angle $\theta 3$ corresponds to a value obtained by dividing 360 degrees by a value that is three times the number of the permanent magnet burying holes 12, the angle $\theta 5$ corresponds to a value obtained by dividing 360 degrees by a value that is five times the number of the permanent magnet burying holes 12, and the angle $\theta 7$ corresponds to a value obtained by dividing 360 degrees by a value that is seven times the number of the permanent magnet burying holes 12, and the non-magnetic portions 13, 14, 15 and 16 are arranged as described above, whereby the curve L0 of the field magnetic flux appearing on the rotor surface becomes closer to the curve L1 or sinusoidal wave, without the harmonic suppressing effect being hindered. Furthermore, mechanical strength is obtained.

In particular, the end of the non-magnetic portion 16 that is closer to the center (pole center) of the permanent magnet burying hole 12 is at the position (angle $\theta 3$) corresponding to a phase at which the third harmonic of the field magnetic flux is zero. The suppression of the third harmonic is not hindered even when the magnetic flux flows outside in the vicinity of this position. There is no significant need to provide non-magnetic portions in the area closer to the pole center past this position. This is because, while fifth- or higher-order harmonics cross zero in this area, a sinusoidal wave varies less in the pole center area, and gaining the amount of field magnetic flux in this area is a desirable design factor to obtain larger field magnetic flux contributing to the torque.

On the other hand, on the side of the position corresponding to the angle $\theta 3$ that is closer to the end (pole interval) of the permanent magnet burying hole 12, the seventh harmonic crosses zero at two positions of angles $\theta 7$ and $2 \cdot \theta 7$. Accordingly, by setting the position between the non-magnetic portions 15 and 16 at the angle $2 \cdot \theta 7$, it is possible to further enhance the mechanical strength without hindering the suppression of the seventh harmonic that crosses zero at the position between the non-magnetic portions 13 and 14 (corresponding to the angle $\theta 7$).

Also, it is desired that, as shown in FIG. 1, the non-magnetic portion 13 have a larger area than the non-magnetic portion 14, the non-magnetic portion 14 have a larger area than the non-magnetic portion 15, and the non-magnetic portion 15 have a larger area than the non-magnetic portion 16. Thus, the non-magnetic materials have larger areas as they are closer to the pole interval from the pole center, and so the magnetic flux generated from the permanent magnet 10 is less likely to flow outside in the area closer to the end of the permanent magnet burying hole 12. This makes the surface magnetic flux density of the rotor 103 further closer to a sinusoidal wave.

Figure 3:
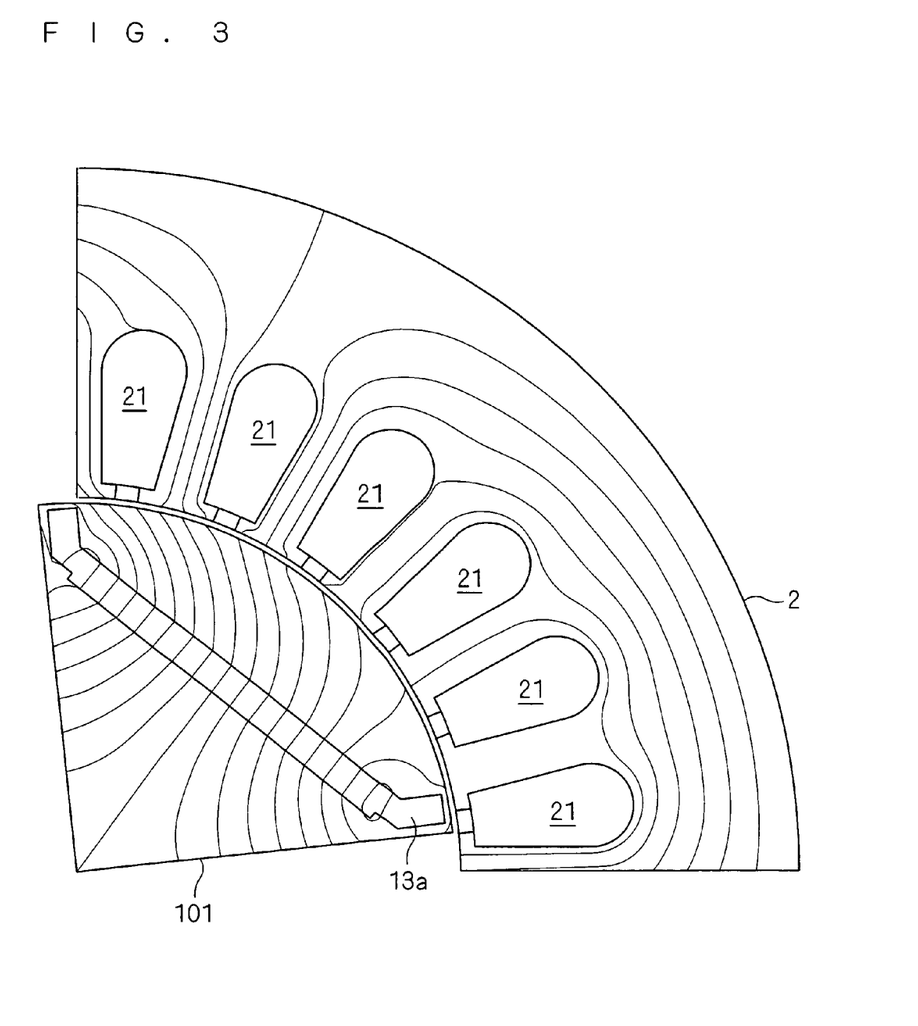
FIG. 3 is a diagram illustrating a distribution of magnetic flux with one magnetic pole.
Figure 4:
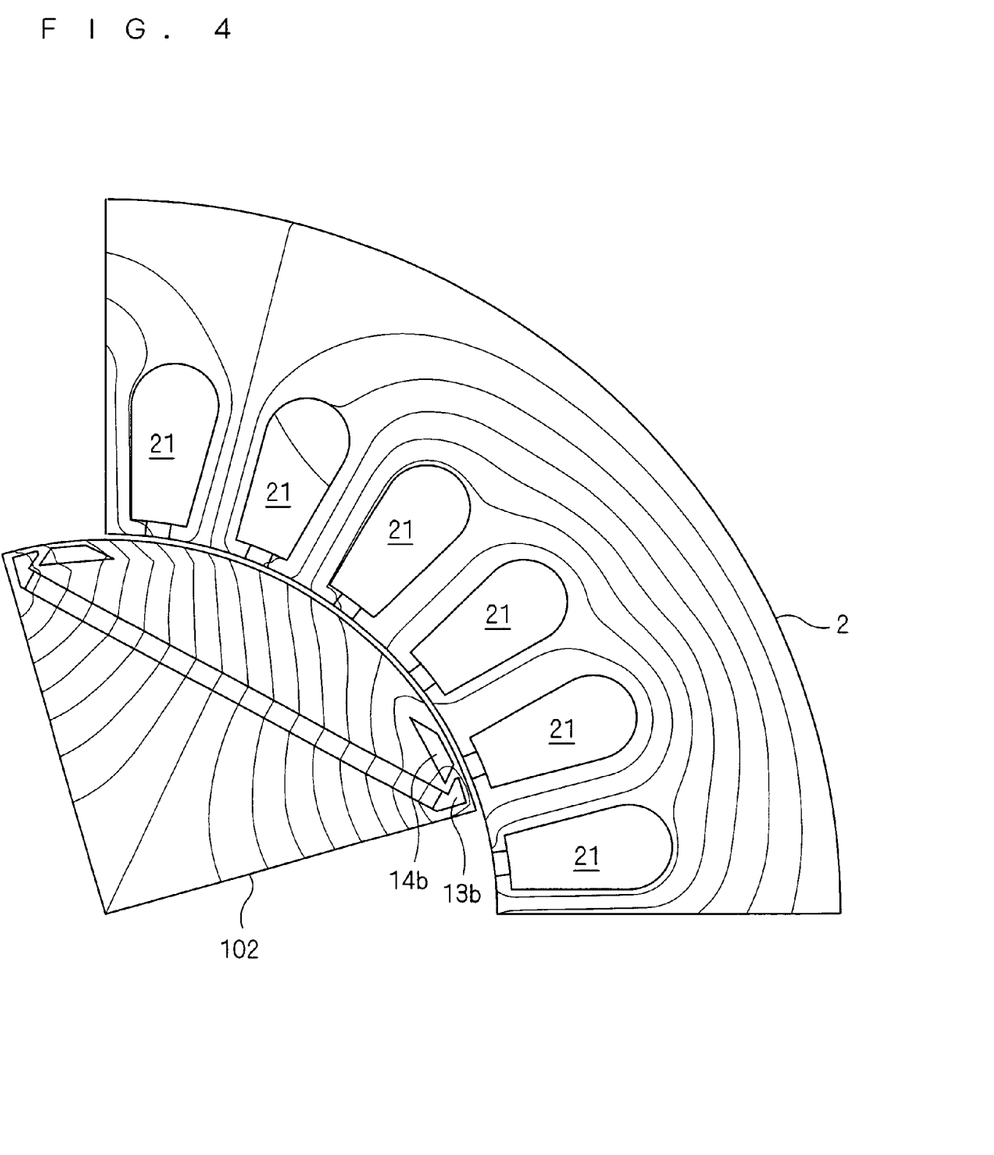
FIG. 4 is a diagram illustrating a distribution of magnetic flux with one magnetic pole.
Figure 5:
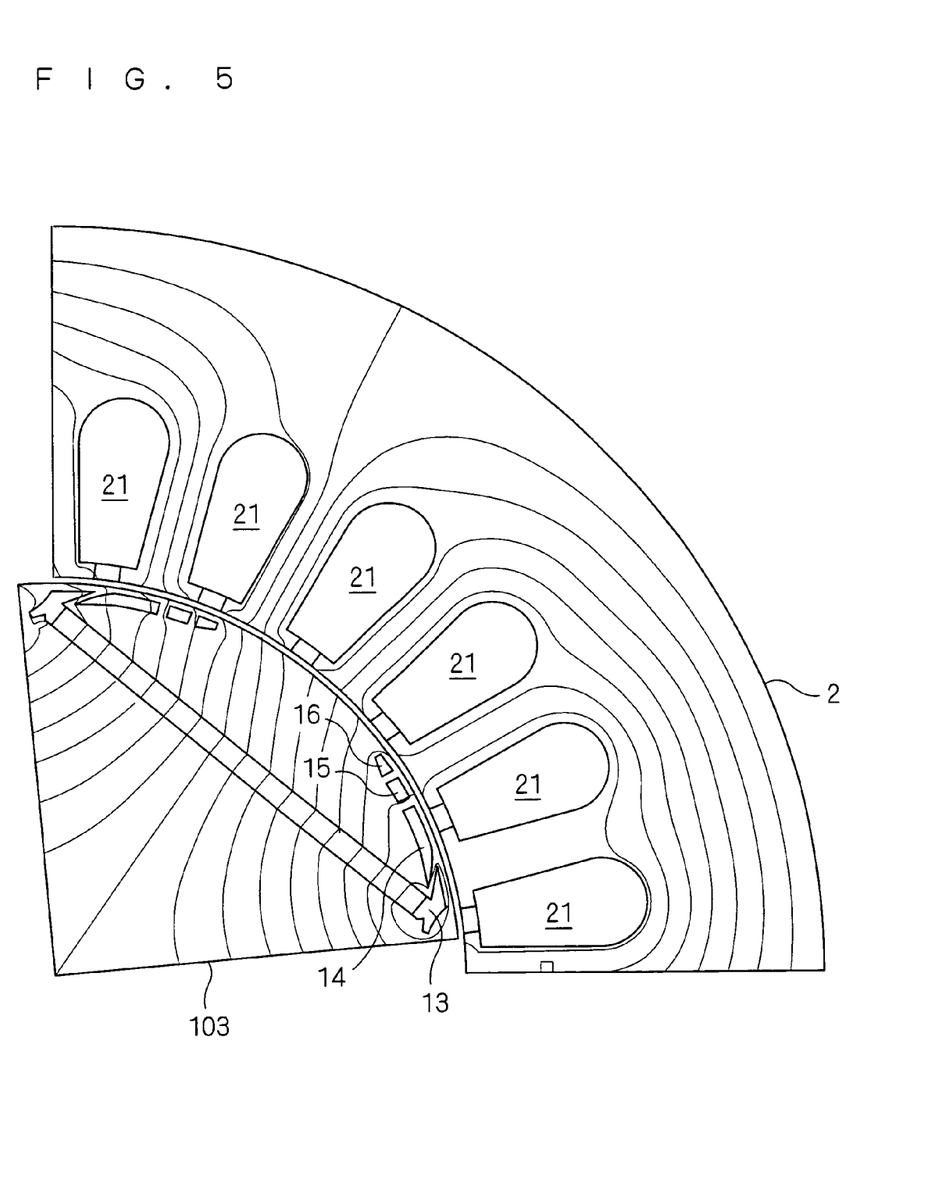
FIG. 5 is a diagram illustrating a distribution of magnetic flux with one magnetic pole.

FIGS. 3 to 5 are diagrams each showing the distribution of magnetic flux, with one magnetic pole in a rotor having two pairs of magnetic poles. FIG. 3 shows a combination of a rotor 101 and a stator 2, FIG. 4 shows a combination of a rotor 102 and the stator 2, and FIG. 5 shows a combination of the above-described rotor 103 and the stator 2. The stator 2 has slots 21, and armature windings are wound through the slots 21. The armature winding can be either a concentrated winding or a distributed winding, but the present invention is more suitable for motors having a distributed-winding stator, because the distributed winding is more likely to involve considerable generation of the third harmonic than the concentrated winding.

In FIG. 3, the rotor 101 has non-magnetic portions 13a at both ends of a permanent magnet 10, in correspondence with the non-magnetic portions 13 of FIG. 1, but it does not have non-magnetic portions corresponding to the non-magnetic portions 14, 15 and 16.

In FIG. 4, the rotor 102 has non-magnetic portions 13b and 14b corresponding to the non-magnetic portions 13 and 14 of FIG. 1, but it does not have non-magnetic portions corresponding to the non-magnetic portions 15 and 16.

Figure 6:
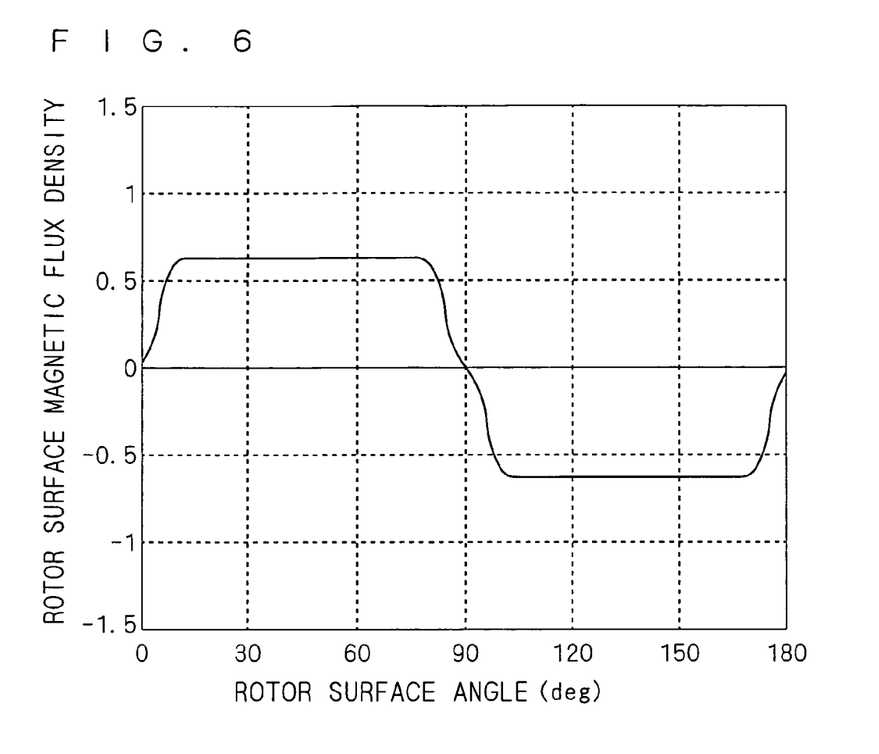
FIG. 6 is a graph illustrating the surface magnetic flux density of a rotor constructed as shown in FIG. 3, with respect to the rotor surface angle.
Figure 7:
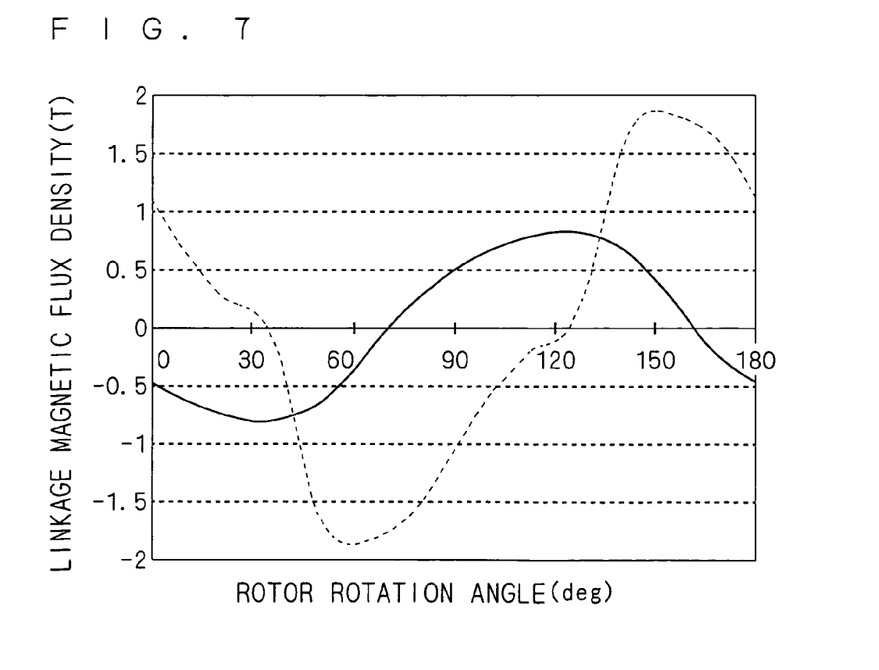
FIG. 7 is a graph illustrating the magnetic flux linking with the stator in a motor constructed as shown in FIG. 3, with respect to the rotation angle of the rotor.

FIG. 6 is a graph showing the surface magnetic flux density of the rotor 101 constructed as shown in FIG. 3, with respect to the rotor surface angle. FIG. 7 is a graph showing the magnetic flux linking with the stator 2 in a motor constructed as shown in FIG. 3, with respect to the rotation angle of the rotor 101.

Figure 8:
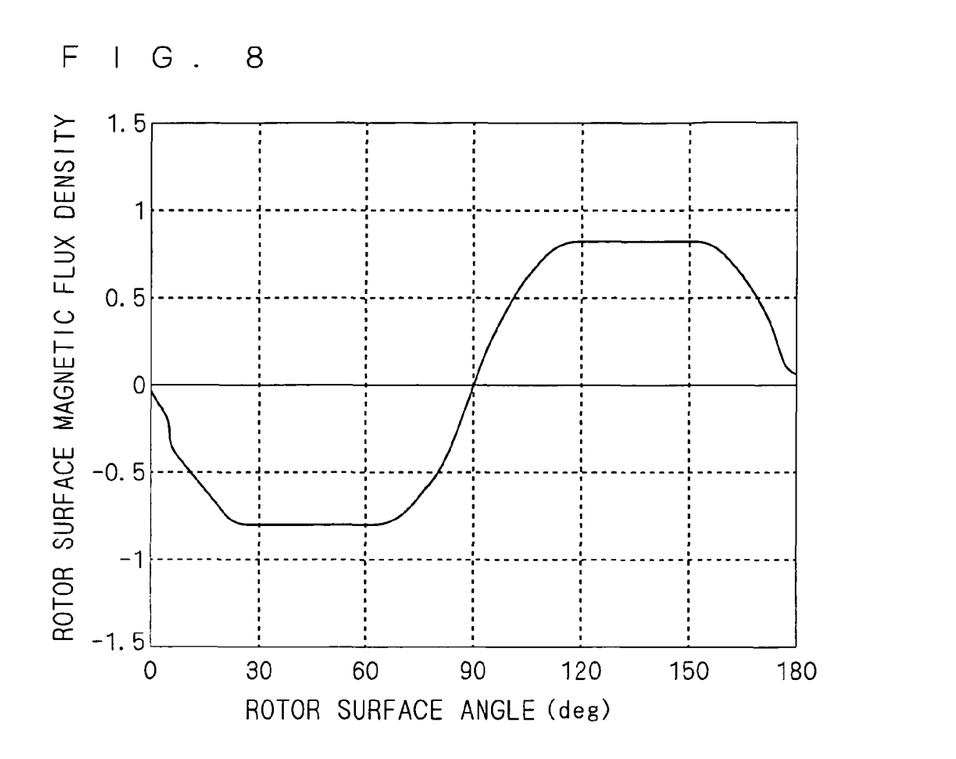
FIG. 8 is a graph illustrating the surface magnetic flux density of a rotor constructed as shown in FIG. 4, with respect to the rotor surface angle.
Figure 9:
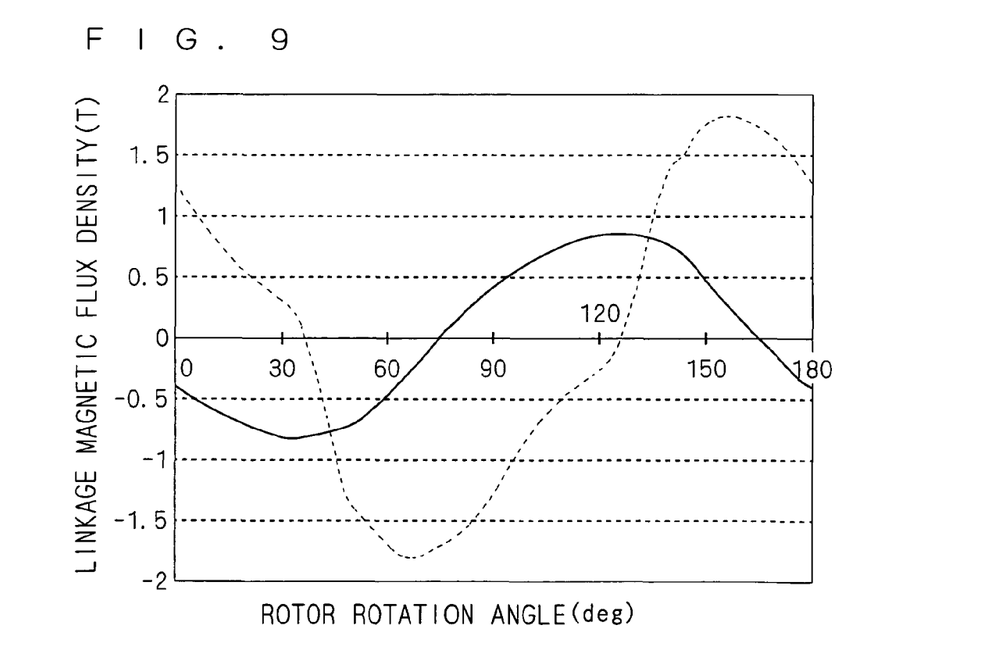
FIG. 9 is a graph illustrating the magnetic flux linking with the stator in a motor constructed as shown in FIG. 4, with respect to the rotation angle of the rotor.

FIG. 8 is a graph showing the surface magnetic flux density of the rotor 102 constructed as shown in FIG. 4, with respect to the rotor surface angle. FIG. 9 is a graph showing the magnetic flux linking with the stator 2 in a motor constructed as shown in FIG. 4, with respect to the rotation angle of the rotor 102.

Figure 10:
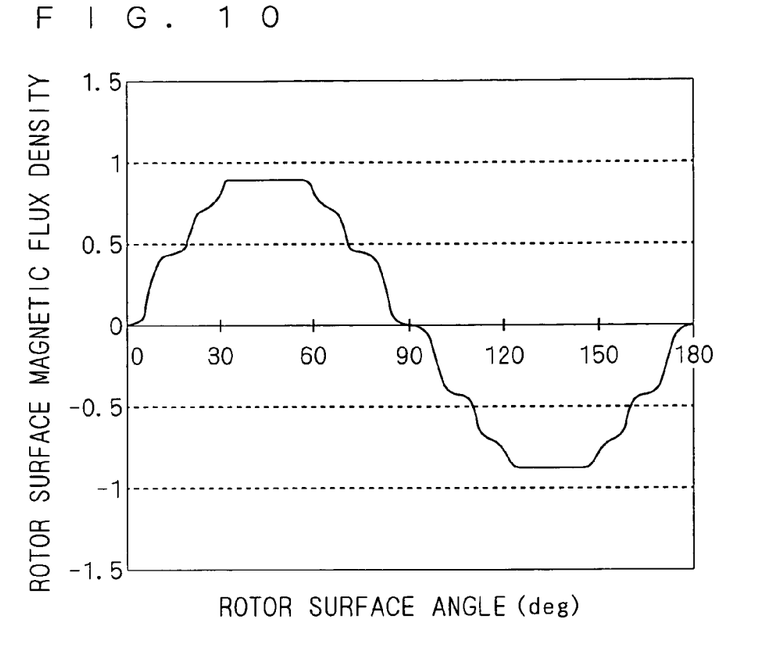
FIG. 10 is a graph illustrating the surface magnetic flux density of a rotor constructed as shown in FIG. 5, with respect to the rotor surface angle.
Figure 11:
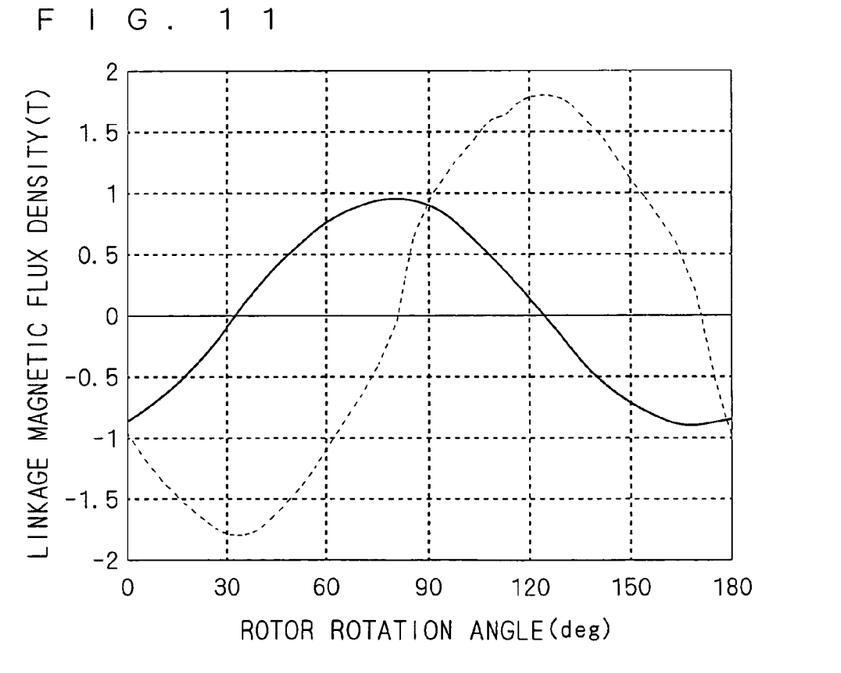
FIG. 11 is a graph illustrating the magnetic flux linking with the stator in a motor constructed as shown in FIG. 5, with respect to the rotation angle of the rotor.

FIG. 10 is a graph showing the surface magnetic flux density of the rotor 103 constructed as shown in FIG. 5, with respect to the rotor surface angle. FIG. 11 is a graph showing the magnetic flux linking with the stator 2 in a motor constructed as shown in FIG. 5, with respect to the rotation angle of the rotor 103.

In FIGS. 7, 9 and 11, solid and broken lines respectively show the magnetic flux densities of magnetic flux passing through the back yoke portion and the teeth portion of the stator 2.

As can be seen by comparing FIGS. 6, 8 and 10, the magnetic flux density on the rotor surface of the rotor 102 is closer to a sinusoidal wave than that of the rotor 101 is, and that of the rotor 103 is further closer to a sinusoidal wave than that of the rotor 102 is. As shown in FIG. 10, the magnetic flux density on the surface of the rotor 103 is stepwise. However, even when such a stepwise magnetic flux density is occurring on the rotor surface, the magnetic flux linking with the stator is in a sinusoidal form with respect to the rotation angle.

Figure 12:
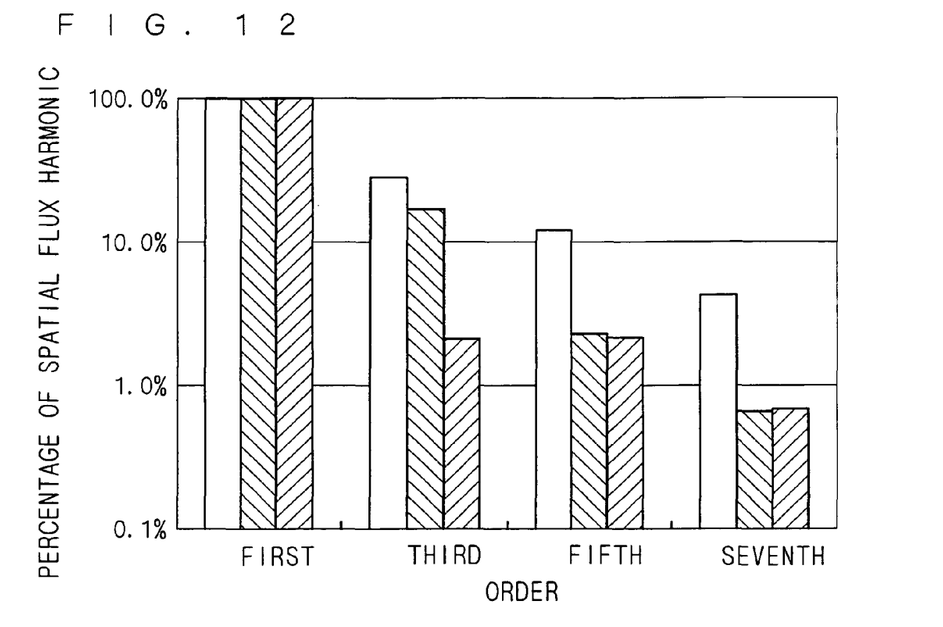
FIG. 12 is a graph illustrating the magnitudes of harmonic components with respect to the fundamental component, about the spatial variations of magnetic flux density on the rotor surface shown in FIGS. 6, 8 and 10.
Figure 13:
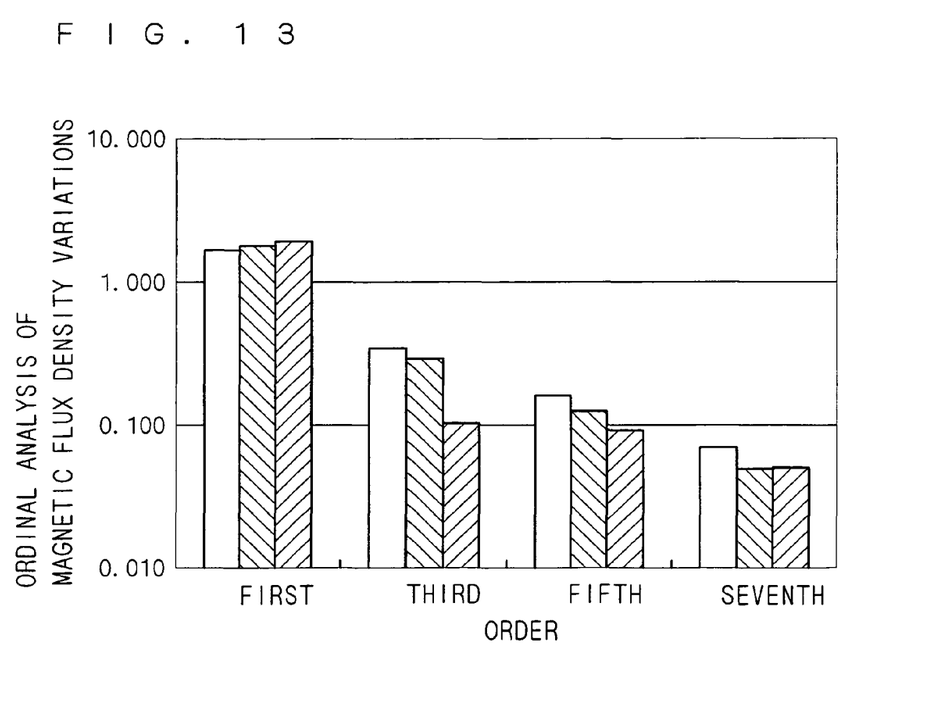
FIG. 13 is a graph illustrating the magnitudes of harmonic components with respect to the fundamental component, about the time variations of magnetic flux density magnitude of linking magnetic flux as shown in FIGS. 7, 9 and 11.

FIG. 12 is a diagram showing the magnitudes of the harmonic components with respect to the fundamental component, about the spatial variations of magnetic flux density on the rotor surface (which correspond to variations with respect to the surface angle) shown in FIGS. 6, 8 and 10. FIG. 13 is a graph showing the magnitudes of the harmonic components with respect to the fundamental component, about the time variations of the magnitude of magnetic flux density of linking magnetic flux (which correspond to variations with respect to the rotation angle) shown in FIGS. 7, 9 and 11. At each order, the left, central, and right bars correspond to the rotors 101, 102, and 103, respectively.

As compared with the rotor 101, the rotor 102 considerably reduces the fifth harmonic and the seventh harmonic to about the same extents as the rotor 103. However, the rotor 103 more considerably reduces the third harmonic than the rotor 102 does. This is true also about the time variations of the magnetic flux densities.

Thus, this preferred embodiment offers enhanced mechanical strength while making the rotor surface magnetic flux density closer to a sinusoidal wave.

Second Preferred Embodiment

Figure 14:
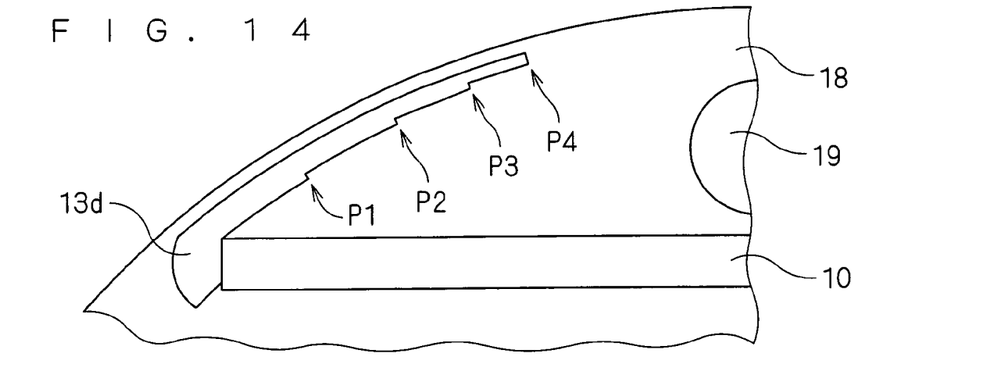
FIG. 14 is a cross-sectional view illustrating a part of a rotor according to a second preferred embodiment of the present invention.
Figure 15:
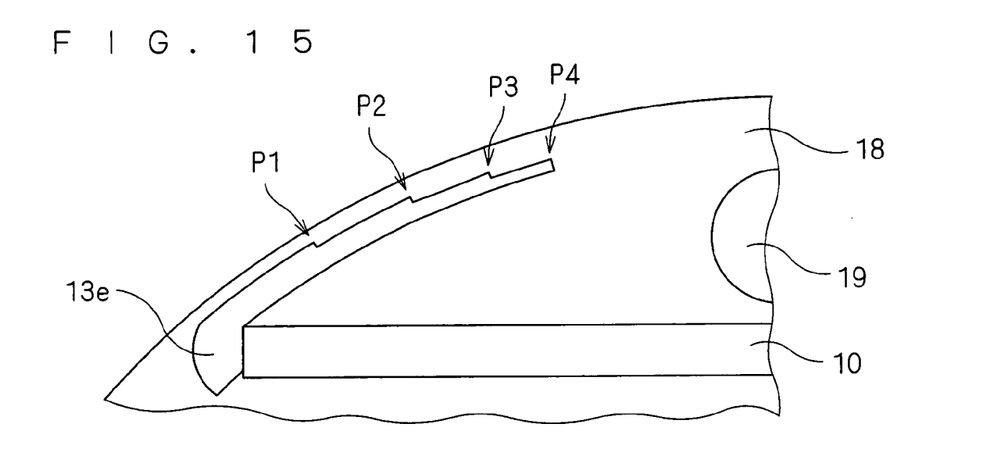
FIG. 15 is a cross-sectional view illustrating a part of a rotor according to the second preferred embodiment of the present invention.

FIGS. 14 and 15 are cross-sectional views each illustrating a part of a rotor according to a second preferred embodiment of the present invention. This preferred embodiment presents structures having a non-magnetic portion 13d (FIG. 14) or a non-magnetic portion 13e (FIG. 15) in place of the non-magnetic portions 13, 14, 15 and 16 of the first preferred embodiment.

Forming the non-magnetic portion 13d or 13e as an air gap is desirable because then the magnetic core can be easily constructed by laminating steel plates having blanks in the position of the non-magnetic portion 13d or 13e.

The non-magnetic portion 13d and 13e each extend around the axis to an end P4, from an end toward the center of a permanent magnet burying hole 12, and the non-magnetic portions 13d and 13e each have steps P1, P2 and P3 and a width narrowing in the direction in which they extend. That is, the width becomes narrower toward the center of the magnetic pole. FIGS. 14 and 15 each only show the vicinity of one end of a permanent magnet burying hole 12 to show the structure in an enlarged manner, but it is desired that the same structure be provided at all ends of the permanent magnet burying holes 12 as shown in FIG. 1.

In the non-magnetic portion 13d, the steps P1, P2 and P3 appear on the side facing the permanent magnet burying hole 12, and in the non-magnetic portion 13e, the steps P1, P2 and P3 appear on the side opposite from the permanent magnet burying hole 12.

The non-magnetic portions of the second preferred embodiment extend continuously, and therefore the structure of the first preferred embodiment having a plurality of separated non-magnetic portions is more desired in terms of the achievement of mechanical strength. However, this preferred embodiment is more desired in terms of the formation of the magnetic core, e.g. by blanking.

The positions of the steps P1, P2, P3 and the end P4 correspond respectively to the above-described angles θ7, θ5, 2·θ7 and θ3. Thus, as in the first preferred embodiment, between the pole interval and the pole center, the varying width of the non-magnetic portion 13d or 13e alleviates the stepwise difference in the amount of field magnetic flux flowing out from the permanent magnet 10. This makes the magnetic flux density on the rotor surface closer to a sinusoidal wave.

In particular, the structure in which the width of the non-magnetic portion 13d or 13e becomes narrower in the direction of extension from an end toward the center of the permanent magnet burying hole 12 corresponds to the structure of the first preferred embodiment in which the areas of the non-magnetic portions 13, 14, 15 and 16 become smaller in this order, whereby the rotor surface magnetic flux density can be easily made closer to a sinusoidal wave.

Thus, reduced is the harmonics that cross zero at angles around the axis Q with reference to the position between poles, translated from the positions of the steps P1, P2, P3 and the end P4.

Figure 16:
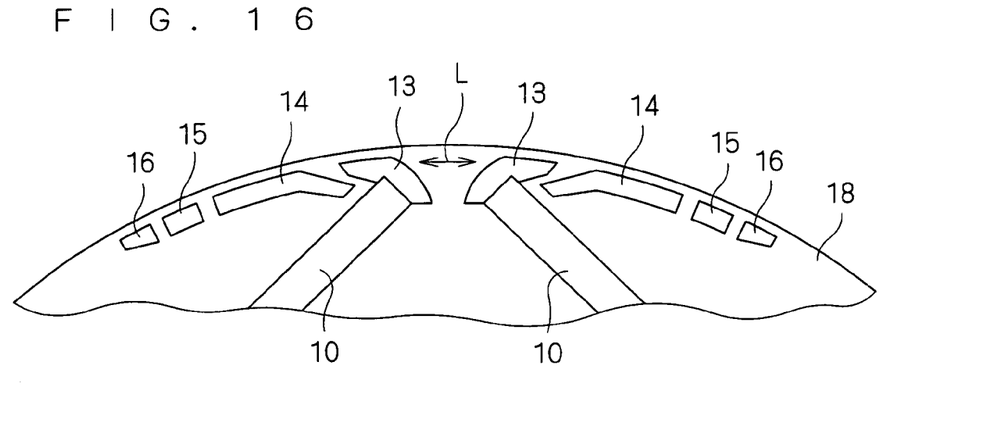
FIG. 16 is a cross-sectional view illustrating a part of a rotor according to a modification of the present invention.

Modifications (i) FIG. 16 is a cross-sectional view illustrating a structure that is adopted as a modification of the first preferred embodiment of the present invention. A pair of non-magnetic portions 13 are provided at the ends of adjacent different permanent magnet burying holes 12, and face each other through the magnetic core 18, wherein it is desired that the distance L between the pair of non-magnetic portions 13 become larger as it becomes closer from the axis Q toward the side that the stator faces (the outer periphery in this example).

Adapting this structure, the magnetic core is less likely to experience magnetic saturation on the side that the stator faces. Thus, on the side that the stator faces, the field magnetic flux generated from the permanent magnets 10 is prevented from flowing in a short-circuit manner within the rotor to adjacent other permanent magnets 10. This prevents reduction of the magnetic flux that links with the stator and contributes to the generation of torque.

The second preferred embodiment is also modified in the same way. That is, it is desired that the distance between a pair of non-magnetic portions 13d (or non-magnetic portions 13e) that are provided at the ends of adjacent different permanent magnet burying holes 12 and that face each other through the magnetic core 18 become larger as it becomes closer from the axis Q toward the side that the stator faces.

(ii) A magnetic core may be constructed by adopting the non-magnetic portions 13, 14, 15 and 16 of the first preferred embodiment in combination with at least one of the non-magnetic portions 13d and 13e of the second preferred embodiment.

While the invention has been described in detail, the foregoing description is in all aspects illustrative and not restrictive. It is understood that numerous other modifications and variations can be devised without departing from the scope of the invention.

The invention claimed is:

1. A magnetic core for a rotor, said magnetic core comprising:
   permanent magnet burying holes arranged around an axis; and
   a first non-magnetic portion, a second non-magnetic portion, and a third non-magnetic portion arranged around the axis from an end toward a center of each said permanent magnet burying hole, wherein a value of an angle around said axis with reference to a position between adjacent said permanent magnet burying holes, translated from a position of an end of said third non-magnetic portion that is located closer to a center of corresponding said permanent magnet burying hole, is a value obtained by dividing 360 degrees by a value that is three times the number of said permanent magnet burying holes.

2. The magnetic core for a rotor according to claim 1, wherein a distance between one said first non-magnetic portion provided at an end of one said permanent magnet burying hole and another said first non-magnetic portion provided at an end of another said permanent magnet burying hole adjacent to said one permanent magnet burying hole becomes larger from said axis toward a side that a stator faces.

3. A rotor comprising:
   the magnetic core for a rotor according to claim 1; and
   permanent magnets buried in said permanent magnet burying holes.

4. A magnetic core for a rotor, said magnetic core comprising:
   permanent magnet burying holes arranged around an axis; and
   a first non-magnetic portion, a second non-magnetic portion, and a third non-magnetic portion arranged around the axis from an end toward a center of each said permanent magnet burying hole, wherein, when expressed as an angle around said axis with reference to a position between adjacent said permanent magnet burying holes, then an angle corresponding to a position between said first non-magnetic portion and said second non-magnetic portion is a value obtained by dividing 360 degrees by a value that is seven times the number of said permanent magnet burying holes.

5. The magnetic core for a rotor according to claim 4, wherein a distance between one said first non-magnetic portion provided at an end of one said permanent magnet burying hole and another said first non-magnetic portion provided at an end of another said permanent magnet burying hole adjacent to said one permanent magnet burying hole becomes larger from said axis toward a side that a stator faces.

6. A rotor comprising:
   the magnetic core for a rotor according to claim 5; and
   permanent magnets buried in said permanent magnet burying holes.

7. A rotor having a magnetic core, said magnetic core comprising:
   permanent magnet burying holes arranged around an axis;
   a permanent magnet buried in at least one of said permanent magnet burying holes;
   a first non-magnetic portion, a second non-magnetic portion, and a third non-magnetic portion arranged around the axis from an end toward a center of each said permanent magnet burying hole, wherein said first non-magnetic portion, said second non-magnetic portion, and said third non-magnetic portion are air gaps.

8. The rotor according to claim 7, wherein a distance between one said first non-magnetic portion provided at an end of one said permanent magnet burying hole and another said first non-magnetic portion provided at an end of another said permanent magnet burying hole adjacent to said one permanent magnet burying hole becomes larger from said axis toward a side that a stator faces.

9. A magnetic core for a rotor, said magnetic core comprising:
   permanent magnet burying holes arranged around an axis; and
   a first non-magnetic portion, a second non-magnetic portion, and a third non-magnetic portion arranged around the axis from an end toward a center of each said permanent magnet burying hole, said magnetic core further comprising a fourth non-magnetic portion arranged around said axis together with said first non-magnetic portion, said second non-magnetic portion, and said third non-magnetic portion, said fourth non-magnetic portion being positioned between said second non-magnetic portion and said third non-magnetic portion,
   wherein, when expressed as an angle around said axis with reference to a position between adjacent said permanent magnet burying holes, then an angle corresponding to a position between said third non-magnetic portion and said fourth non-magnetic portion is twice an angle corresponding to a position between said first non-magnetic portion and said second non-magnetic portion.

10. The magnetic core for a rotor according to claim 9, wherein, seen in a direction along said axis, said fourth non-magnetic portion has an area smaller than that of said second non-magnetic portion and larger than that of said third non-magnetic portion.

11. The magnetic core for a rotor according to claim 9, wherein said first non-magnetic portion, said second non-magnetic portion, said third non-magnetic portion, and said fourth non-magnetic portion are air gaps.

12. The magnetic core for a rotor according to claim 9, wherein a distance between one said first non-magnetic portion provided at an end of one said permanent magnet burying hole and another said first non-magnetic portion provided at an end of another said permanent magnet burying hole adjacent to said one permanent magnet burying hole becomes larger from said axis toward a side that a stator faces.

13. A rotor comprising:
the magnetic core for a rotor according to claim 9; and
permanent magnets buried in said permanent magnet burying holes.

14. A magnetic core for a rotor, said magnetic core comprising:
permanent magnet burying holes arranged around an axis; and
a first non-magnetic portion, a second non-magnetic portion, and a third non-magnetic portion arranged around the axis from an end toward a center of each said permanent magnet burying hole, said magnetic core further comprising a fourth non-magnetic portion arranged around said axis together with said first non-magnetic portion, said second non-magnetic portion, and said third non-magnetic portion, said fourth non-magnetic portion being positioned between said second non-magnetic portion and said third non-magnetic portion,
wherein, when a position between said second non-magnetic portion and said fourth non-magnetic portion is expressed as a value of an angle around said axis with reference to a position between adjacent said permanent magnet burying holes, then said value is a value obtained by dividing 360 degrees by a value that is five times the number of said permanent magnet burying holes.

15. The magnetic core for a rotor according to claim 14, wherein, seen in a direction along said axis, said fourth non-magnetic portion has an area smaller than that of said second non-magnetic portion and larger than that of said third non-magnetic portion.

16. The magnetic core for a rotor according to claim 14, wherein said first non-magnetic portion, said second non-magnetic portion, said third non-magnetic portion, and said fourth non-magnetic portion are air gaps.

17. The magnetic core for a rotor according to claim 14, wherein a distance between one said first non-magnetic portion provided at an end of one said permanent magnet burying hole and another said first non-magnetic portion provided at an end of another said permanent magnet burying hole adjacent to said one permanent magnet burying hole becomes larger from said axis toward a side that a stator faces.

18. A rotor comprising:
the magnetic core for a rotor according to claim 14; and
permanent magnets buried in said permanent magnet burying holes.

* * * * *